United States Patent [19]

Herring et al.

[11] Patent Number: 4,552,176
[45] Date of Patent: Nov. 12, 1985

[54] VALVE SLIDE PLATE

[75] Inventors: William P. Herring, Hemer; Jan R. Kostorz, Menden, both of Fed. Rep. of Germany

[73] Assignee: Friedrich Grohe Armaturenfabrik GmbH & Co., Hemer, Fed. Rep. of Germany

[21] Appl. No.: 556,183

[22] Filed: Nov. 29, 1983

[30] Foreign Application Priority Data

Nov. 29, 1982 [DE] Fed. Rep. of Germany ....... 3244119

[51] Int. Cl.⁴ ............................................ F16K 11/06
[52] U.S. Cl. ................................... 137/625.4; 251/368
[58] Field of Search ...................... 251/368; 137/625.4

[56] References Cited

U.S. PATENT DOCUMENTS

| 1,947,257 | 2/1934 | Fritz et al. | 251/368 X |
| 3,533,436 | 10/1970 | Parkison . | |
| 4,010,772 | 3/1977 | Palmer et al. . | |
| 4,258,751 | 3/1981 | Humpert | 251/368 X |
| 4,292,997 | 10/1981 | Bernat | 251/368 X |
| 4,301,836 | 11/1981 | Hunziker | 137/625.4 |
| 4,375,824 | 3/1983 | Borries et al. | 137/625.4 |

FOREIGN PATENT DOCUMENTS

| 0021029 | 5/1980 | European Pat. Off. . |
| 2757672 | 6/1979 | Fed. Rep. of Germany . |
| 3131916 | 3/1982 | Fed. Rep. of Germany . |

OTHER PUBLICATIONS

WO 79/00134 International Patent Classification, Friedrich Grohe Armaturenfabrik GmbH & Co., Inventor: Georg Bernat et al., Aug. 14, 1978.
European Search Report EP 83 11 1800, Mar. 2, 1984.

Primary Examiner—Arnold Rosenthal
Attorney, Agent, or Firm—Karl F. Ross; Herbert Dubno

[57] ABSTRACT

A valve slide plate of ceramic oxide or a similarly suitable material with at least one overflow passage in the form of an aperture and which is movable on a rigidly mounted base plate with fluid passages by a driver element includes a flexible seal which is interposed between the valve slide plate and the driver element and is vulcanized to the valve slide plate, and which engages the driver element with only a minimal contact pressure determined by the prevailing pressure of the liquid flowing through the valve.

3 Claims, 5 Drawing Figures

VALVE SLIDE PLATE

FIELD OF THE INVENTION

This invention relates to a valve slide plate of the type utilized in fluid control valves such as water mixing valves or the like.

More specifically, the invention relates to a valve slide plate of ceramic oxide or a similarly suitable material having at least one overflow passage which is disposed on a rigidly mounted base plate having fluid passages and is movable thereon by means of a driver element.

BACKGROUND OF THE INVENTION

A valve slide plate of this nature is described in DE-OS No. 27 57 672. In the case of this valve slide the slide plate is sealed with a guide member or driver element. Bonding or interposition of conventional seal rings etc. is proposed for sealing the two components to one another. Bonding of the two components is problematical and relatively time consuming, particularly in mass production. When interposing rubber washers or other conventional seals between the two components, pre-tensioning of the seal rings is necessary to ensure positive sealing even at the maximum pressures occurring in the fluid flowing through the components. This relatively high pre-tension of the seal will, however, cause corresponding pressure to be exerted by the slide plate on the base plate thereby resulting in a relatively high level of stiffness of the valve.

SUMMARY OF THE INVENTION

In accordance with the invention, a valve slide plate is provided with a seal which with minimum possible space requirement and negligibly low contact pressure ensures positive sealing of the aperture in the valve slide plate in relation to the driver element.

A valve slide plate in accordance with the invention, includes a seal vulcanized thereon to seal the flow aperture in relation to the driver element.

The one-piece design of a slide plate and seal advantageously provides a single component and ideal positioning of the seal is made possible, thus permitting minimization of the seal pre-tensioning forces.

In one embodiment of the invention, the seal is designed as a lip-type seal to thereby reduce the pre-tensioning force to a negligible level since the sealing lips are pressed into sealing position as a function of the prevailing liquid pressure.

In another embodiment, the seal is formed as a diaphragm which completely seals the aperture, no contact pressure is necessary for sealing purposes. The diaphragm is merely supported by the driver element to withstand the liquid pressure.

BRIEF DESCRIPTION OF THE DRAWING

The invention will be better understood from a reading of the following detailed description in conjunction with the drawing in which.

DETAILED DESCRIPTION

Figure 1:
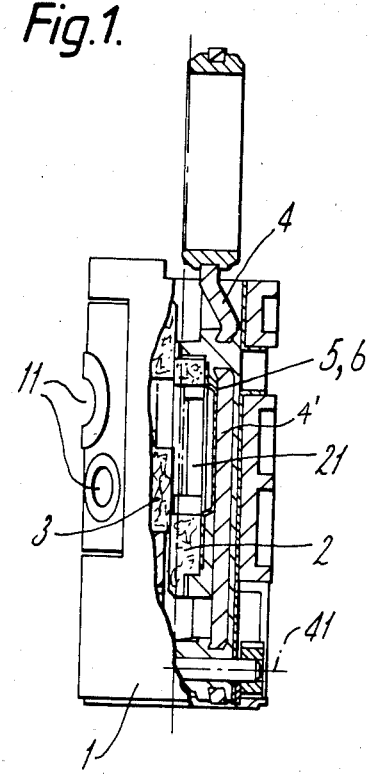
FIG. 1 is a partial section of a water mixing valve for use in sanitary pipe fittings.

The mixing valve shown in the drawing is intended for use in sanitary pipe fittings and consists of a slide housing 1 in which, parallel to the center axis, is rigidly located a baseplate 3 of ceramic oxide material with passages 11 for cold, hot and mixed water and on which is mounted a slide plate 2 also of ceramic oxide material. The contact faces of plates 2 and 3 are precision machined to ensure watertight contact. Slide plate 2 is positioned by a driver element 4 having a plate-shaped member 4' which can slide in slide housing 1 parallel to the center axis for the purpose of flow regulation and can swivel about a center of rotation 41 to regulate the mixture ratio and determine the temperature of the emerging mixed water. Slide plate 2 has, for optional connection of passages 11 in base plate 3, an overflow passage in the form of aperture 21.

To seal aperature 21 in relation to driver element 4, a seal is vulcanized on to slide plate 2.

Figure 2:
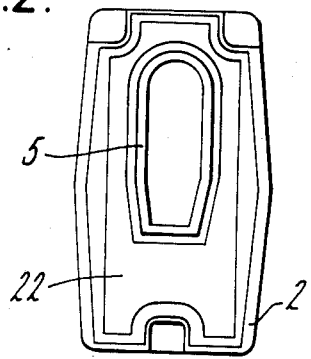
FIG. 2 is an enlarged plan view of a slide plate with lip-type seal such as can be used in the mixing valve as per FIG. 1.
Figure 3:
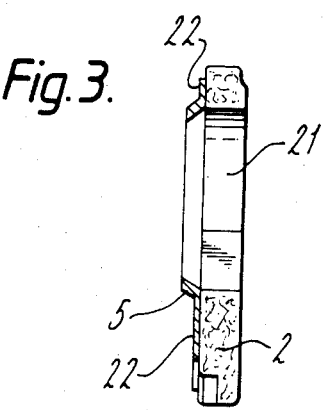
FIG. 3 is a lateral section through the slide plate of FIG. 2.

In accordance with the embodiment shown in FIGS. 2 and 3, the seal can take the form of a lip-type seal with inclined sealing lips so that they can be forced by the water pressure into sealing position. This arrangement also ensures that the seal can be matched with suitable flexure to compensate for manufacturing tolerances without significant additional contact pressure being produced. Lip-type seal 5 is vulcanized on to slide plate 2 in areas 22.

Figure 4:
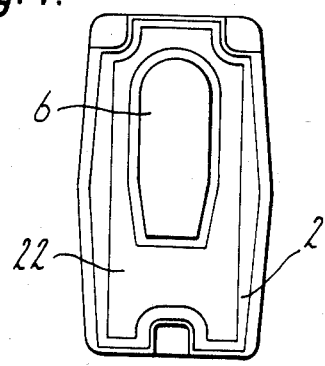
FIG. 4 is a slide plate with a diaphragm.
Figure 5:
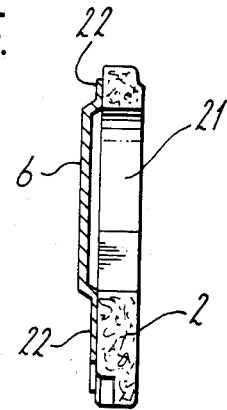
FIG. 5 is a lateral section through the slide plate of FIG. 4.

In the embodiment of FIGS. 4 and 5, a diaphragm 6 is provided as seal which is vulcanized on to a slide plate 2 in areas 22. With this design no contact pressure is necessary for watertight closure. It is only necessary to provide a suitable location on driver element 4 to support diaphragm 6 in relation to the prevailing water pressure.

What is claimed is:

1. In a valve including a housing having a fixed valve base plate defining inlet ports for first and second liquids and an outlet port for mixed liquids, a valve slide plate of ceramic oxide material or the like located in said housing and having opposite faces one of which is in sliding contact with a surface of said valve base plate, said valve slide plate being provided with an interior overflow passage extending entirely therethrough from said one face to the other face of said valve slide plate and adapted to communicate with said inlet and outlet ports, and a movable driver element in said housing, said valve slide plate being connected to said driver element for joint movement therewith;

the improvement comprising that:

(a) said driver element includes a plate-shaped member having a surface juxtaposed to said other face of said valve slide plate, said plate-shaped member carrying said valve slide plate; and (b) a flexible vulcanized seal member is interposed between said other face of said valve slide plate and said surface of said plate-shaped member, said seal member being vulcanized to said valve slide plate at said other face of the latter around the periphery of said overflow passage and being in engagement with said surface of said plate-shaped member to provide a seal between said drive element and said valve slide plate, said seal member being formed to engage said plate-shaped member with only a minimal contact pressure determined by the prevailing liquid pressure.

2. A valve in accordance with claim 1, wherein said seal member is a lip-type seal with circumferential flexible sealing lips inclined inwardly of said seal member and toward said plate-shaped member of said driver element.

3. A valve in accordance with claim 1, wherein said seal member is a diaphragm which overlies the entire overflow passage and has a medial region connected to the periphery of said seal member, which is vulcanized to said valve slide plate, by a circumferential intermediate region inclined inwardly of said seal member and toward said plate-shaped member of said driver element.

* * * * *